United States Patent [19]

Pham-Phu

[11] Patent Number: 4,764,087
[45] Date of Patent: Aug. 16, 1988

[54] CHANNEL FOR FEEDING WATER TO A VERTICAL-AXIS KAPLAN WATER TURBINE

[75] Inventor: Ngo Pham-Phu, Vizille, France
[73] Assignee: Société Neyrpic, Grenoble, France
[21] Appl. No.: 868,078
[22] Filed: May 29, 1986
[30] Foreign Application Priority Data Jun. 3, 1985 [FR] France .................. 85 08506

[51] Int. Cl.⁴ ........................ F04D 29/66
[52] U.S. Cl. .................. 415/142; 415/182; 415/219 R
[58] Field of Search .......... 415/142, 500, 219 R, 415/182, 129, DIG. 1

[56] References Cited

U.S. PATENT DOCUMENTS

| 1,007,230 | 10/1911 | Orten-Boving | 415/201 |
| 1,308,108 | 7/1919 | Peterson | 415/142 |
| 1,865,502 | 7/1932 | Biggs | 415/129 |
| 1,934,636 | 11/1933 | Martin | 415/500 |
| 1,962,383 | 6/1934 | Biggs | 415/129 |
| 2,064,313 | 12/1936 | Moody | 415/129 |
| 2,897,375 | 7/1959 | Fevre | 415/217 |

FOREIGN PATENT DOCUMENTS 179536 11/1935 Switzerland .................. 415/130

*Primary Examiner*—Robert E. Garrett
*Assistant Examiner*—John T. Kwon
*Attorney, Agent, or Firm*—Dowell & Dowell

[57] ABSTRACT

This invention relates to a channel for supplying water to a vertical-axis Kaplan water turbine, wherein the vertical side walls thereof are oriented in convergent manner in order that, at turbine level, they join an end face of rounded form, of which the radius of curvature is slightly greater than the radius of the guide blades located above the turbine and the sleeve of the turbine shaft and/or an inclined fixed wall downstream of the turbine are provided, for preventing the development of suction eddies downstream of the sleeve of the turbine shaft.

1 Claim, 2 Drawing Sheets

CHANNEL FOR FEEDING WATER TO A VERTICAL-AXIS KAPLAN WATER TURBINE

BACKGROUND OF THE INVENTION

1. Field of the Invention

The present invention relates to a vertical-axis low head water turbine of the Kaplan type.

2. History of the Related Art

In cases where turbines ae operated at low head, i.e. where the heights or depth of fluid supply is measured between some meters and some tens of meters, vertical-axis Kaplan water turbines are used which are supplied via a water chamber, i.e. a feeding channel in the open air or under load. A truncated distributor converging downstream, i.e. downwardly in this case, is also conventionally used.

However, tests on reduced models of such turbines have demonstrated disturbing phenomena:

For example, in a water chamber, there are zones of dead water which promote the development of the eddies appearing at other points of the water chamber, but these dead water zones may themselves also give rise to the creation of vortices.

In addition, downstream of the shaft of said turbine or its circular sleeve, a separation of the flow of water is produced with appearance or creation of vortices. These vortices increase, taking along air beneath the free surface so that the vortices are transformed into suction eddies.

SUMMARY OF THE INVENTION

It is an object of the improvements forming the subject matter of the present invention to overcome the two drawbacks mentioned above and to produce a feeding channel of a vertical-axis Kaplan water turbine which, on the one hand, eliminates the dead water zones in the channel and, on the other hand, avoids the formation of suction eddies.

To that end, the vertical side walls of the feeding channel according to the invention are oriented in convergent manner in order that, at turbine level, the width of the channel is slightly greater than the diameter of the distributor located above the turbine; in addition, flow directing members are provided in the channel and downstream of the turbine for preventing the development of suction eddies downstream of its shaft.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
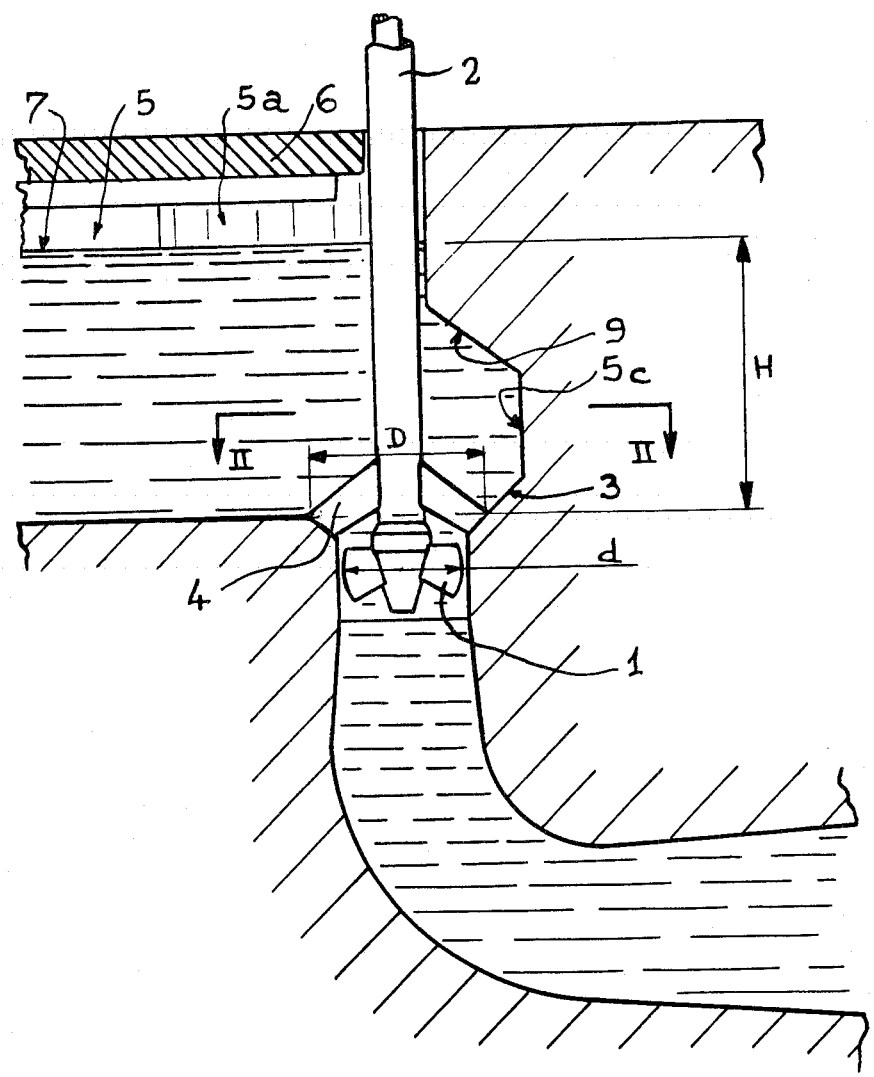
FIG. 1 illustrates in vertical section a vertical-axis Kaplan water turbine supplied via a water chamber incorporating the improvements according to the invention.

Referring now to the drawings, FIG. 1 schematically illustrates a hydraulic installation for a vertical-axis Kaplan water turbine. It is observed that the turbine 1, fitted at the lower end of a vertical shaft mounted in a sleeve 2 is placed below a distributor 3 with truncated wall, comprising guide blades 4 joining the wall of the distributor to sleeve 2 of the shaft of turbine 1.

Water is supplied to turbine 1 via a channel 5 with free surface, of which the top is closed by slabs 6. It is observed that the upstream free surface of the liquid, referenced 7, in the feeding channel lies well below slabs 6.

Figure 2:
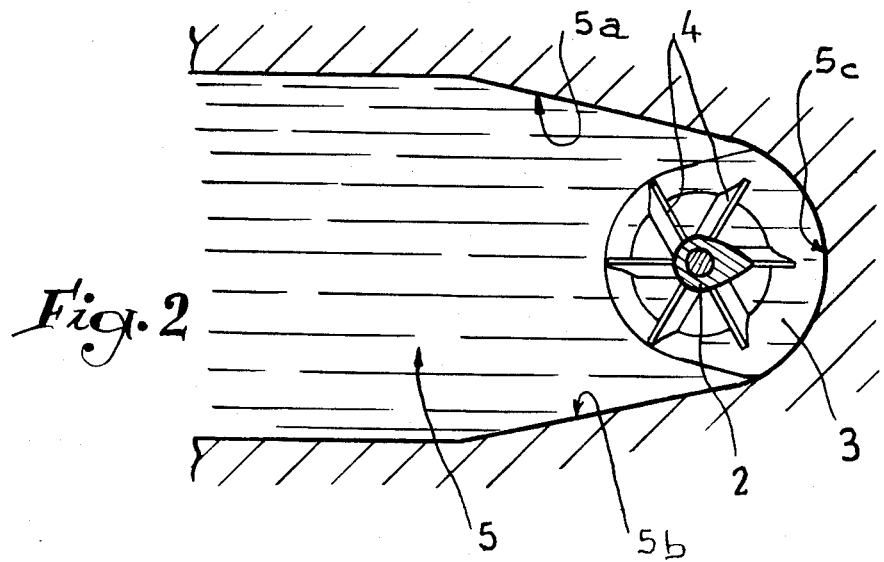
FIG. 2 is a section thereof along II—II (FIG. 1).

In accordance with the invention and as illustrated in FIG. 2, the vertical side walls 5a and 5b of channel 5 are oriented in convergent manner in the direction of the vertical plane of symmetry of the channel, so that they join the rounded end face or wall 5c of this channel. The diameter defining the arc of the end wall is slightly greater than the outer diameter D of the guide blades 4.

As indicated hereinabove, the dead water zones of the conventional water chambers promote the development of vortices or are capable of creating some themselves. However, in the present invention, the convergent from of the walls in the zone of the turbine, walls 5a, 5b of channel 5 make it possible to eliminate the dead water zones and the drawbacks thereof as far as the vortices are concerned.

Figure 3:
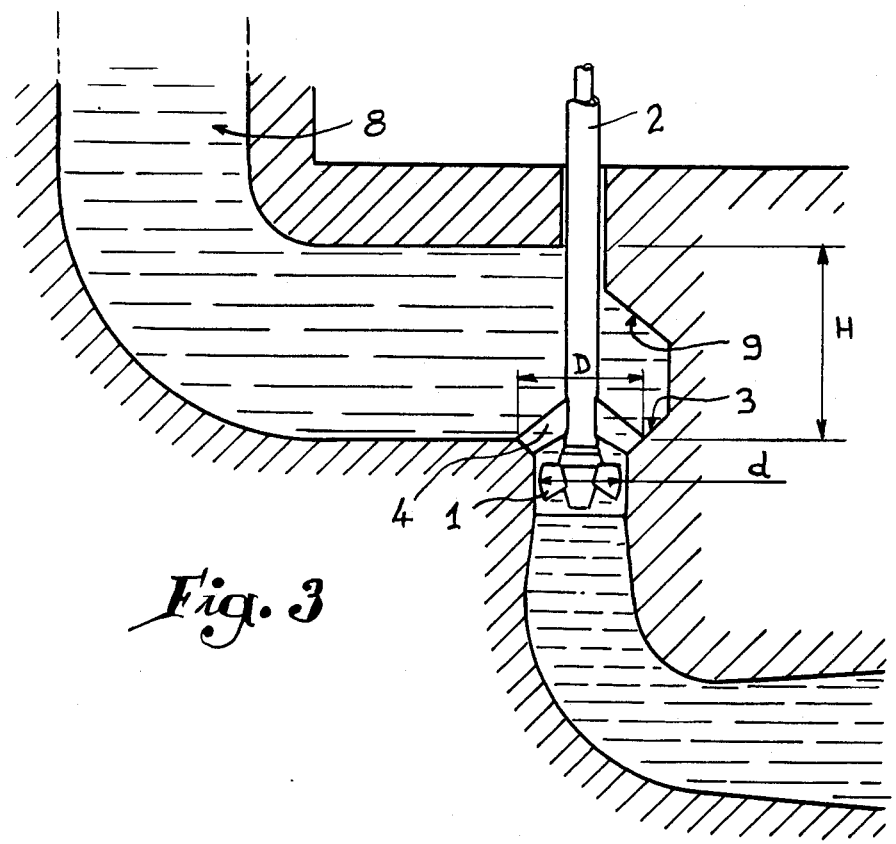
FIG. 3 is a view similar to that of FIG. 1, but illustrating a supply via a conduit under load instead of a water chamber.

It goes without saying that, if channel 5 is a conduit 8 under load, such as the one illustrated in FIG. 3, its vertical side walls located in the zone of the turbine may be given convergent orientations such as those illustrated in FIG. 2.

In the case of a free surface, downstream of a conventional sleeve of the shaft of turbine 1, a separation of the flow occurs, with appearance of vortices which, on increasing, take along air lying above the free surface 7 of the water of channel 5. The vortices in question are then transformed into suction eddies. These eddies are a source of vibrations and operational instability.

In accordance with the invention, separation of the flow may be eliminated by three types of means.

Firstly, sleeve 2 of the shaft of the turbine may be profiled so as to give it an aerodynamic ovoidal shape in transverse section as shown at 2.a in FIG. 2.

A float may also be provided in the compartment of the channel downstream of the turbine. This float would form a screen between the free air above the surface 7 of the water and the latter, so as to break the vortices when they develop. However, it is difficult to fix this float to the walls of the channel, especially when the turbine is equipped with an upstream stop valve whose closure may drain the channel or the conduit in question.

In accordance with the invention, the device chosen for eliminating the suction eddies downstream of the turbine consists of a fixed wall or mask 9 inclined downwardly from upstream to downstream and located downstream of sleeve 2 of the shaft of the turbine.

Thanks to the invention, the height H of the free surface of the water 7 in channel 5 may thus be very substantially reduced, limited to about 1.4 d (d=diameter of turbine 1), while, without the devices according to the invention, the minimum height must be about 2 d. This is particularly interesting in both cases, whether a channel with free surface or a conduit 8 under pressure is used, since the dimensions of this feeding conduit may thus be reduced by about 30%.

It must, moreover, be understood that the foregoing description has been given only by way of example and that it in no way limits the domain of the invention which would not be exceeded by replacing the details of execution described by any other equivalents.

What is claimed is:

1. In a channel for supplying water to a vertical axis Kaplan water turbine wherein the turbine is supported between sidewalls of the channel by a vertical shaft which extends through the channel and wherein the sidewalls of the channel extend from the upstream side to the downstream side of the vertical shaft and wherein guide vanes are provided which are positioned above the turbine and extend outwardly from the vertical shaft a distance defined by a first diameter, the improvement comprising, said channel having an end wall of arcuate configuration located downstream of the vertical shaft, said sidewalls of said channel converging toward one another adjacent the vertical shaft and downstream thereof toward said end wall, said end wall having an arcuate contour which is defined by a diameter which is greater than the first diameter of the guide vanes, and flow diverting means provided along the downstream side of the vertical shaft for preventing the development of suction eddies downstream of the vertical shaft from which the turbine is supported, said flow diverting means including a vertical sleeve disposed about said vertical shaft, said vertical sleeve having a transverse section of generally ovoidal configuration so as to extend downstream of the vertical shaft, and mask wall means inclined downwardly from adjacent said sleeve means to said end wall downstream of said vertical sleeve.

* * * * *